Aug. 25, 1936.    H. G. W. CHICHESTER-MILES    2,051,940

BUCKET AND PAIL

Filed July 25, 1935

INVENTOR.
HERBERT GLENCAIRN WRIGHT CHICHESTER-MILES
BY Benj. I. King
ATTORNEY.

Patented Aug. 25, 1936

2,051,940

UNITED STATES PATENT OFFICE 2,051,940

BUCKET AND PAIL

Herbert Glencairn Wright Chichester-Miles, London, England

Application July 25, 1935, Serial No. 33,066
In Great Britain August 15, 1934

4 Claims. (Cl. 150—48)

This invention relates to buckets and pails made of resilient rubber which is flowed into a mould, the resulting vessel, after setting, being collapsible unless provided with an embedded reinforcement and concerns improvements in the manufacture of these articles, with the object of providing a handle in the ordinary step of moulding the article which handle is normally collapsed and out of the way when the vessel is not being carried, so that there is no necessity to attach a pivoted or similar handle for this purpose, as a subsequent operation, thus avoiding expense and difficulties. A further object is to manufacture the article with such an integral handle so that there is no fear of same becoming pulled off when the vessel is in use.

Thus the invention aims at overcoming disadvantages which arise from the known practice of fitting a separate handle, to a resilient rubber vessel above referred to.

Broadly the invention consists in forming a resilient rubber bucket or pail, in the course of the moulding operation, with an integral and flexible handle, arranged such that by reason of its flexibility it can be raised from a collapsed position for carrying purposes.

In carrying out the invention the vessel is formed, in the course of the moulding operation, with separate handle portions at opposite sides adapted, when free, to fall to positions level with or below the mouth of the vessel. It is convenient to produce these handle portions by forming the vessel, in the course of the moulding operation, with an outer top rim united to the body of the article at opposite positions, so as to form two loops which are adapted to be bent upwardly to constitute handles.

A practical embodiment of the invention will now be described with reference to the accompanying drawing wherein:—

Figure 1:
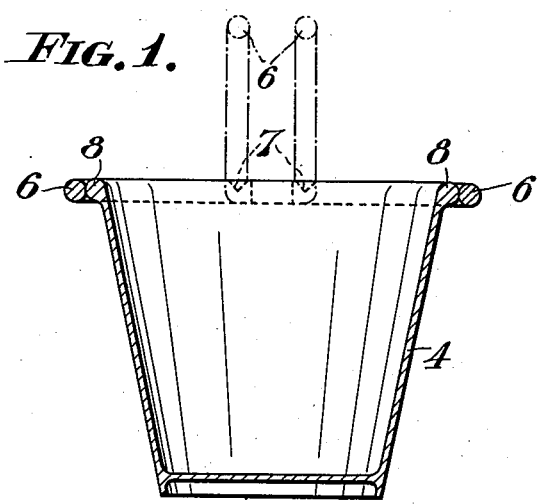
Figure 1 is a vertical section through the vessel.
Figure 2:
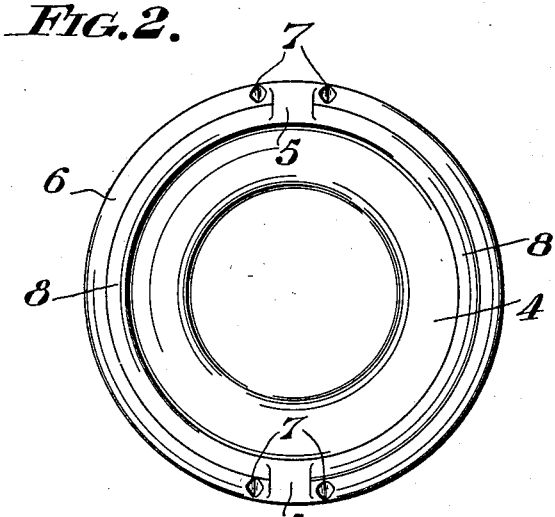
Figure 2 is a plan view.
Figure 3:
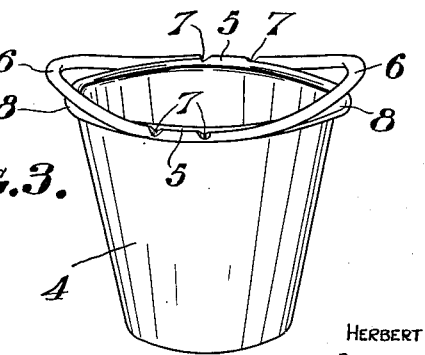
Figure 3 is a perspective view showing the handle portions slightly raised for the sake of clearness.

Referring to the drawing, the body 4 of the vessel is formed with integral lugs 5 diametrically opposite one another and handle portions 6 which extend around opposite sides of the vessel between the two lugs 5, said handle portions being integral with said lugs 5. V-shaped notches 7 are formed in the upper surfaces of the handle portions 6 in the localities of the junctions of said handle portions with the lugs 5, and these notches form definite bending points for the handle portions so that the latter, when upturned, have predetermined formalities and effect support from definite points to ensure proper balance. In this upturned position the handle portions are disposed side-by-side to constitute a double handle, whilst in their normal free positions they lie approximately level with the mouth of the vessel, as shown, or depend slightly therebelow.

The above construction and formation of the vessel is produced by the use of a mould having a rim formed with outer channels in the plane of the top of the cavity of the mould in which the body of the pail is formed, each of said channels following the contour of the top of the cavity and extending slightly less than half-way around the cavity. Said channels merge into the cavity by way of oppositely disposed passages, and the rubber which is caused to flow into them produces the handle portion 6 whilst the rubber which occupies the oppositely disposed passages forms the lugs 5 which connect said handle portions to the body of the vessel. The aforesaid channels are positioned close to the cavity of the mould, said cavity preferably being formed to produce a rim or bead 8 on the upper edge of the body 4, and in this manner the handle portions 6 will have their inner surfaces in intimate contact with or in close proximity to the bead 8. A spigot shaped to correspond to the cavity of the mould, is employed in conjunction with the latter, and has an external flange adapted to lie over the channels aforesaid formed in the rim of the mould.

The V-shaped notches 7 may be formed either in the course of the moulding operation or as subsequently cut out.

Owing to the natural tendency for the handle portions to fall back to or below the level of the top of the vessel the invention is especially applicable to toy buckets used in playing with sand, since they present no obstruction to interfere with tipping the sand out of the bucket.

It will be understood that the bucket can be readily collapsed for purposes of transport and storage.

If desired suitable reinforcements may be provided to prevent the pail becoming malformed when carrying a weight, and by way of example either or both of the following parts, namely the handle portions 6 and bead 8, may embody such reinforcement which could be embedded during the moulding operation. The reinforcement could consist of a strip or rod made of steel or other suitable metal or material either rigid or having a suitable degree of flexibility. The lugs 5 also may be reinforced.

I claim:

1. A bucket comprising a resilient rubber body and a pair of flexible handle loops integral with said body, said handle loops being disposed at opposite sides of said body and at their ends being joined to said body at substantially diametrically opposite points and between their ends being free from said body for upward and downward swinging movements to operative and inoperative positions, respectively.

2. A bucket comprising a resilient rubber body, a pair of lugs integral with said body at opposite sides thereof, respectively, and a pair of flexible handle loops at opposite sides of said body, respectively, integrally joined at their ends with said lugs and free from the body between their ends for upward and downward swinging movements to operative and inoperative positions, respectively.

3. A bucket comprising a resilient rubber body having a thickened rim, and a pair of flexible handle loops integral with said body, said handle loops being disposed at opposite sides of said body and at their ends being joined to said thickened rim at substantially diametrically opposite points and between their ends being free from said body and rim for upward and downward swinging movements to operative and inoperative positions, respectively, said handle loops when in their inoperative positions being disposed substantially in the plane of said rim and in contact between their ends therewith.

4. A bucket as set forth in claim 2 in which the handle loops are notched adjacent to the lugs to provide definite points of bending for said loops when they are swung upwardly to operative positions.

HERBERT GLENCAIRN WRIGHT
CHICHESTER-MILES.